United States Patent
Kim et al.

(10) Patent No.: US 7,672,069 B2
(45) Date of Patent: Mar. 2, 2010

(54) LINEAR MOTOR AND CAMERA MODULE HAVING THE SAME

(75) Inventors: Kwang Kim, Gyeonggi-do (KR); Ki-Bum Park, Seoul (KR)

(73) Assignee: Korea Polytechnic University Industry Academic Cooperation Foundation, Gyeonggido (KR)

( * ) Notice: Subject to any disclaimer, the term of this patent is extended or adjusted under 35 U.S.C. 154(b) by 0 days.

(21) Appl. No.: 12/332,942

(22) Filed: Dec. 11, 2008

(65) Prior Publication Data
US 2009/0153987 A1   Jun. 18, 2009

(30) Foreign Application Priority Data
Dec. 12, 2007   (KR) ...................... 10-2007-0129344

(51) Int. Cl.
*G02B 15/14* (2006.01)
*G02B 7/02* (2006.01)
(52) U.S. Cl. ....................... 359/824; 359/703
(58) Field of Classification Search ................ 359/824, 359/703, 704
See application file for complete search history.

(56) References Cited

U.S. PATENT DOCUMENTS

2005/0259155 A1 * 11/2005 Okada ................... 348/207.99

* cited by examiner

*Primary Examiner*—Alicia M Harrington
(74) *Attorney, Agent, or Firm*—Kinney & Lange, P.A.

(57) ABSTRACT

A linear motor and a camera module having the linear motor are provided. The linear motor includes: a piezoelectric substrate generating a vibration mode in a longitudinal direction on the basis of an applied voltage; first and second shafts coupled to both sides of the piezoelectric substrate with the piezoelectric substrate interposed therebetween; and a moving member coupled to at least one of the first and second shafts to be movable in the longitudinal direction of the first and second shafts and connected to a camera lens on one side. Accordingly, it is possible to remove a dead zone with a simple structure, to prevent an unnecessary increase in thickness, not to cause a stoppage at the time of moving a camera lens, to cause a small amount of tilt to enable a linear control, and to contribute to a decrease in thickness and a compactness of a mobile terminal.

7 Claims, 10 Drawing Sheets

LINEAR MOTOR AND CAMERA MODULE HAVING THE SAME

BACKGROUND OF THE INVENTION

1. Field of the Invention

The present invention relates to a linear motor and a camera module having the linear motor, and more particularly, to a linear motor that can remove a dead zone with a simple structure, can prevent an unnecessary increase in thickness, does not cause a stoppage at the time of moving a camera lens, has a small amount of tilt to enable a linear control, and can contribute to a decrease in thickness and a compactness of a mobile terminal and a camera module having the linear motor.

2. Description of the Related Art

Mobile terminals such as mobile phones and PCS have required various functions and a decrease in size and thickness.

Particularly, with the generalized use of mobile terminals having a camera attached thereto, techniques associated with an optical lens and an image sensor for high image quality and techniques associated with a zoom function of a camera are considered as being more important.

Mobile terminals equipped with a camera having three million or more pixels, which were embodied in past digital cameras, come to the market. An auto focusing function is required for the cameras of the mobile terminals so as to satisfactorily exhibit their functions.

To additionally provide the auto focusing function to a camera of a mobile terminal, an actuator (actuation unit) moving a camera lens of the mobile terminal should be provided. The actuator needs the have small size and thickness for a decrease in size of the mobile terminal, that is, for a decrease in size and thickness of the mobile terminal. The linear movement, the power consumption, and the driving force of the camera lens should be also considered in addition to the size of the actuator.

A stepping motor or a voice coil motor enabling a linear control could be considered as the actuator for embodying the auto focusing function of the camera lens.

The stepping motor has an advantage of a precise control and a great force, but has a disadvantage of a complex structure and a great volume. The voice coil motor has an advantage of a precise control and a small volume due to the simple structure thereof, but has a disadvantage of great power consumption and weak driving force.

Accordingly, there is a need for a linear motor that can reduce the size, the noise, and the power consumption, does not cause a stoppage at the time of moving a camera lens, and has a small amount of tilt to enable a linear control. For this purpose, studies have been actively done.

FIG. 1 is a graph illustrating a displacement in a longitudinal direction of a shaft under a free-free condition where both ends are not fixed. FIG. 2 is a graph illustrating a displacement in the longitudinal direction of the shaft under a fix-free condition where only one end is fixed. FIG. 3 is a graph illustrating an elastic displacement when the shaft is not fixed. FIG. 4 is a diagram schematically illustrating a structure of a linear motor applied to a past mobile terminal.

A structure of a linear motor 105 applied to a camera module 101 of a past mobile terminal will be first described with reference to FIG. 4. The linear motor 105 has a structure in which a shaft 131 is connected to one side of a piezoelectric substrate 120 generating a vibration mode in the longitudinal direction and a moving member 140 connected to a camera lens 150 is coupled to the shaft 131. A node fixing portion 160 is further disposed in an area adjacent to the piezoelectric substrate 120.

With this structure, when a voltage is applied to the piezoelectric substrate 120 to generate a vibration mode in the longitudinal direction, the moving member 140 coupled to the shaft 131 moves in the longitudinal direction of the shaft 131 as indicated by the solid line or the dotted line in FIG. 4 to move the camera lens 150, thereby embodying the auto focusing function of the camera lens 150.

On the other hand, it has been reported with this structure that the vibration mode of the shaft 131 due to the ultrasonic vibration of the piezoelectric substrate 120 varies depending on a supporting condition of the shaft 131.

For example, under a free-free condition of FIG. 1 where both ends of the shaft are free, a node having an elastic displacement of 0 exists among many points in the shaft 131. This causes a dead zone (a section not moving) of an impact-type actuator depending on restriction conditions (indicated by an arrow in FIG. 1). Under a fix-free condition of FIG. 2 where only one end of the shaft 131 is fixed, the displacement from the fixed point increases from 0 to the other end.

On the other hand, when the shaft 131 of the impact-type actuator is not fixed, a node having an elastic displacement of 0 exists, which is located in the vicinity of the piezoelectric substrate 120 as shown in the graph of FIG. 3.

In order to remove such a node, that is, the dead zone, not to influence the movement, the node fixing portion 160 may be disposed in the vicinity of the node as shown in FIG. 1. However, since the structure shown in FIG. 1 requires an unnecessary increase in thickness (indicated by t in FIG. 1), there is caused a problem that the volume and the thickness of the mobile terminal increases.

SUMMARY OF THE INVENTION

An advantage of some aspects of the invention is that it provides a linear motor that can remove a dead zone with a simple structure, can prevent an unnecessary increase in thickness, does not cause a stoppage at the time of moving a camera lens, has a small amount of tilt to enable a linear control, and can contribute to a decrease in thickness and a compactness of a mobile terminal and a camera module having the linear motor.

According to an aspect of the invention, there is provided a linear motor including: a piezoelectric substrate generating a vibration mode in a longitudinal direction on the basis of an applied voltage; first and second shafts coupled to both sides of the piezoelectric substrate with the piezoelectric substrate interposed therebetween; and a moving member coupled to at least one of the first and second shafts to be movable in the longitudinal direction of the first and second shafts and connected to a camera lens on one side.

Here, the piezoelectric substrate may be disposed at a position corresponding to a thickness of the camera lens.

The moving member may includes: first and second moving blocks movably coupled to the first and second shafts, respectively; and a connection bar connecting the first and second moving blocks to each other so as to equalize the moving speeds of the first and second moving blocks.

The linear motor may further include a connection portion connecting the connection bar and the camera lens to each other.

The linear motor may further include first and second fixing portions fixing exposed ends of the first and second shafts, respectively.

The first and second fixing portions may be disposed on side walls of a module housing constituting an outline of the camera lens.

According to another aspect of the invention, there is provided a camera module including: a module housing; a linear motor having a piezoelectric substrate generating a vibration mode in a longitudinal direction on the basis of an applied voltage, first and second shafts coupled to both sides of the piezoelectric substrate with the piezoelectric substrate interposed therebetween, and a moving member coupled to at least one of the first and second shafts to be movable in the longitudinal direction of the first and second shafts; and a camera lens connected to the moving member of the linear motor in the module housing.

According to the above-mentioned configurations, it is possible to remove a dead zone with a simple structure, thereby improving the auto focusing function of the camera lens.

According to the above-mentioned configurations, it is possible to prevent an increase in thickness of the camera module, thereby contributing to a decrease in thickness and a compactness of the mobile terminal.

By applying the linear motor instead of the stepping motor or the voice coil motor, it is possible to prevent a stoppage at the time of moving the camera lens and to reduce the amount of tilt to enable a linear control, thereby reducing the power consumption.

DETAILED DESCRIPTION OF THE INVENTION

Hereinafter, exemplary embodiments of the invention will be described with reference to the accompanying drawings.

Figure 1:
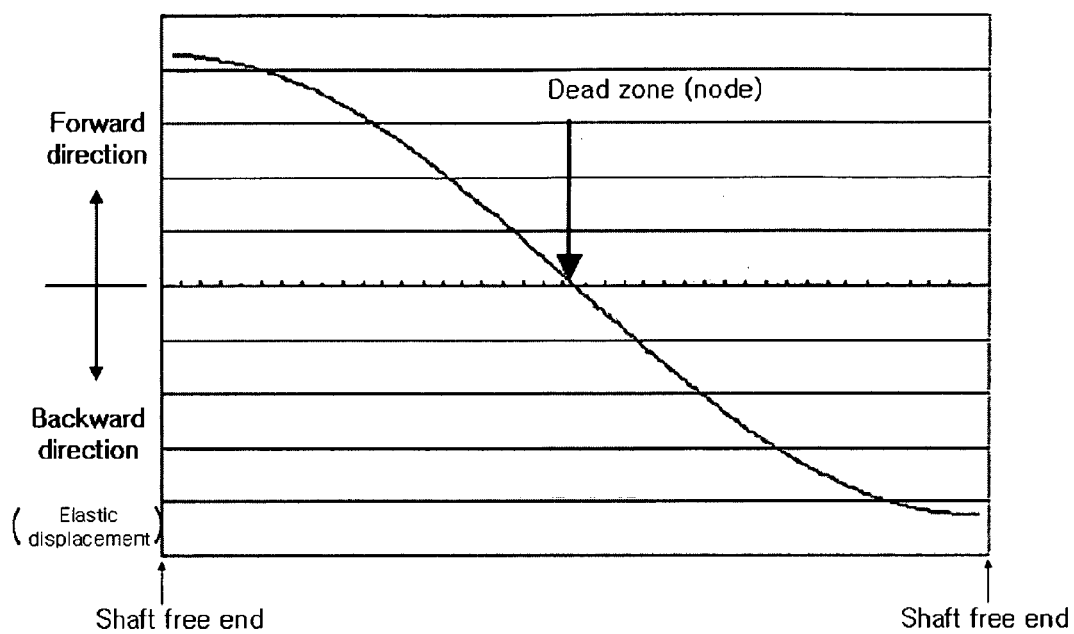
FIG. 1 is a graph illustrating a displacement in a longitudinal direction of a shaft under a free-free condition where both ends are not fixed.
Figure 2:
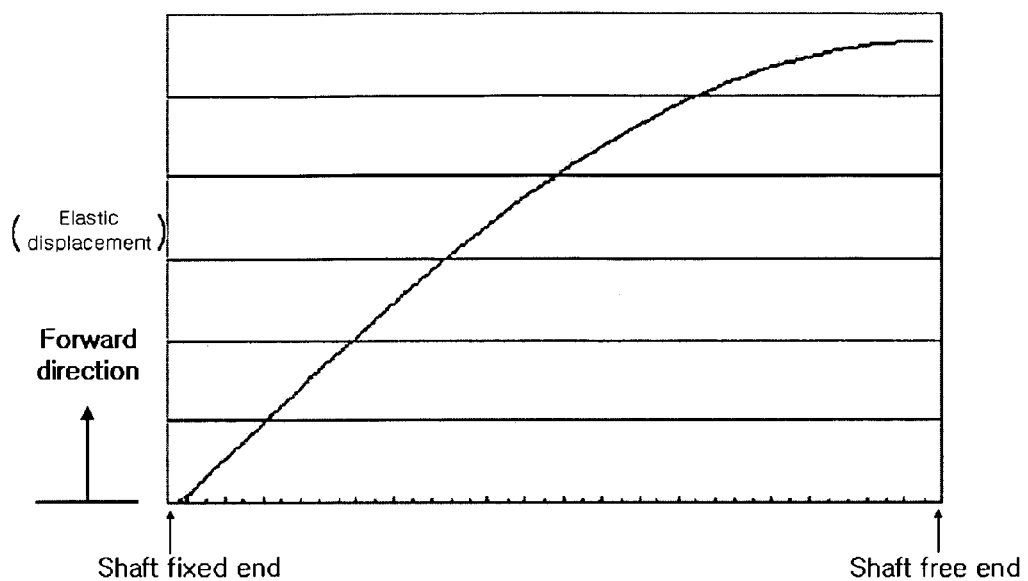
FIG. 2 is a graph illustrating a displacement in the longitudinal direction of the shaft under a fix-free condition where only one end is fixed.
Figure 3:
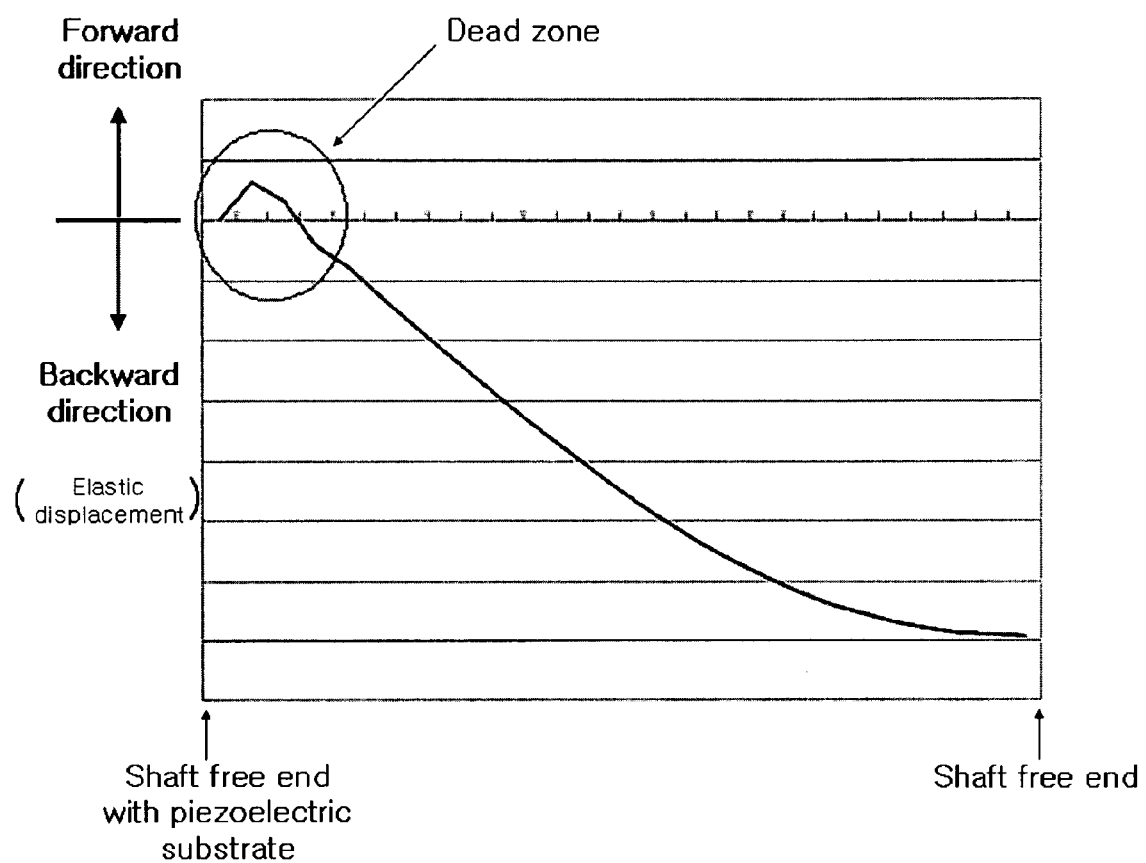
FIG. 3 is a graph illustrating an elastic displacement when the shaft is not fixed.
Figure 4:
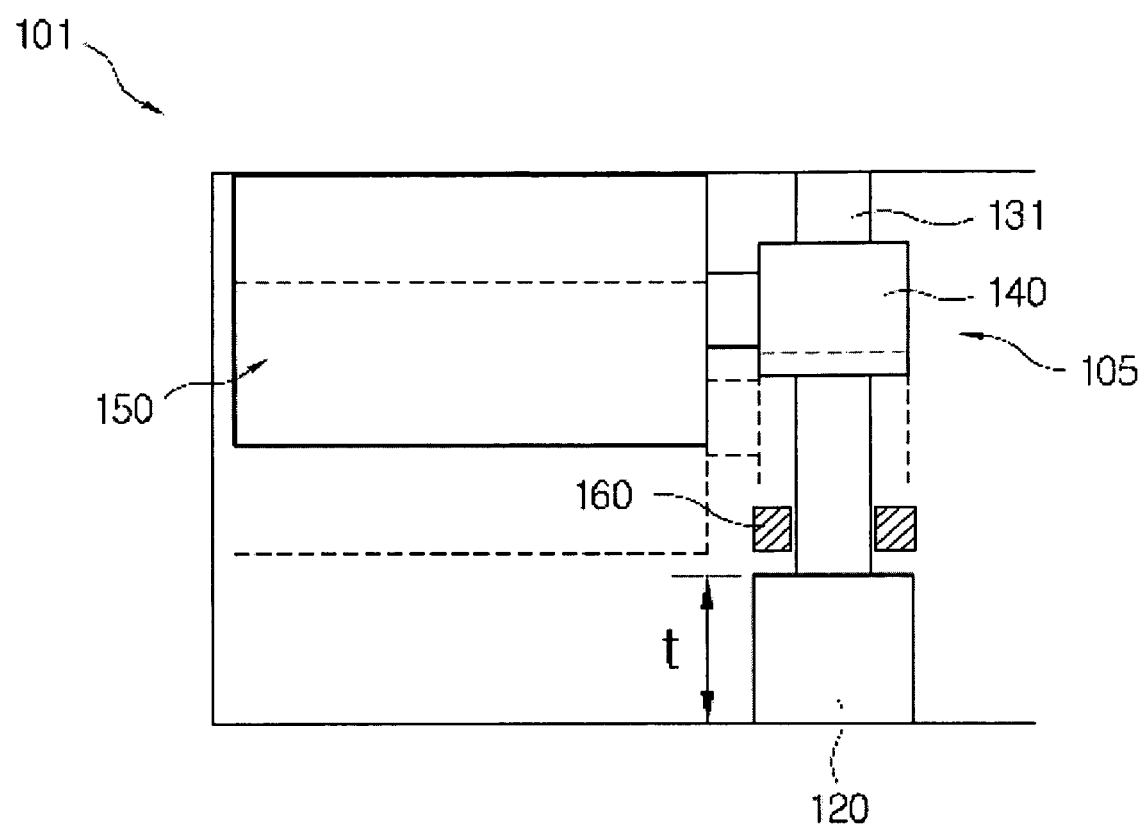
FIG. 4 is a diagram schematically illustrating a structure of a linear motor applied to a known mobile terminal.
Figure 5:
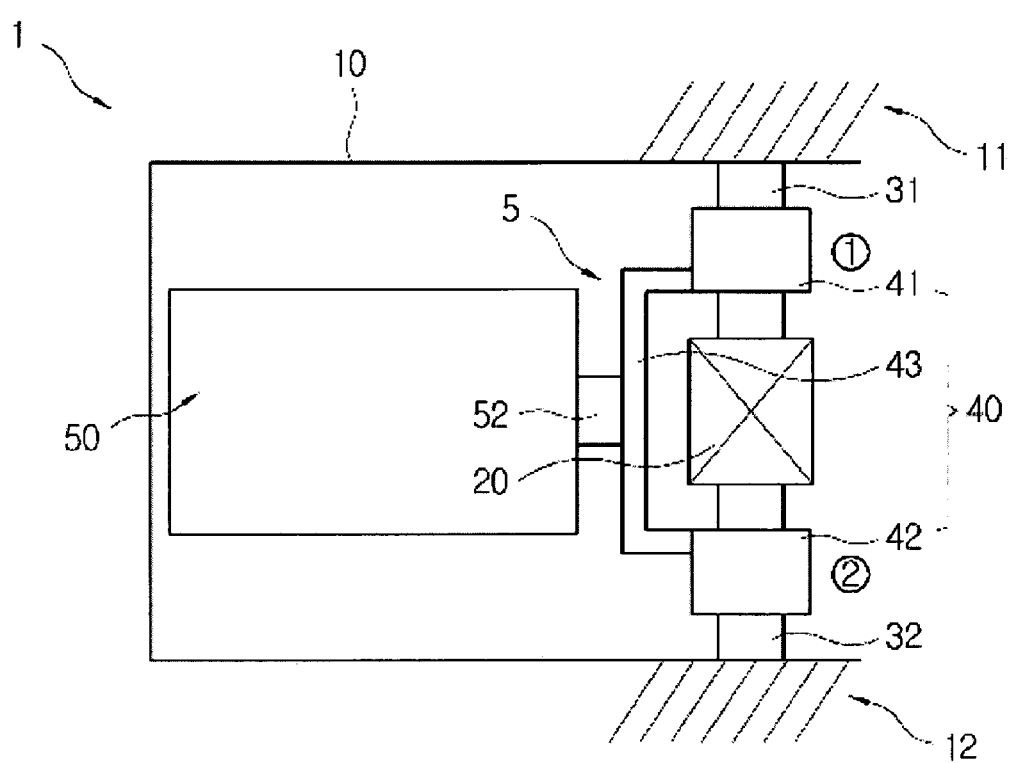
FIGS. 5 to 7 are diagrams schematically illustrating a structure of a camera module applied to a mobile terminal according to an embodiment of the invention, where a camera lens is operating.
Figure 6:
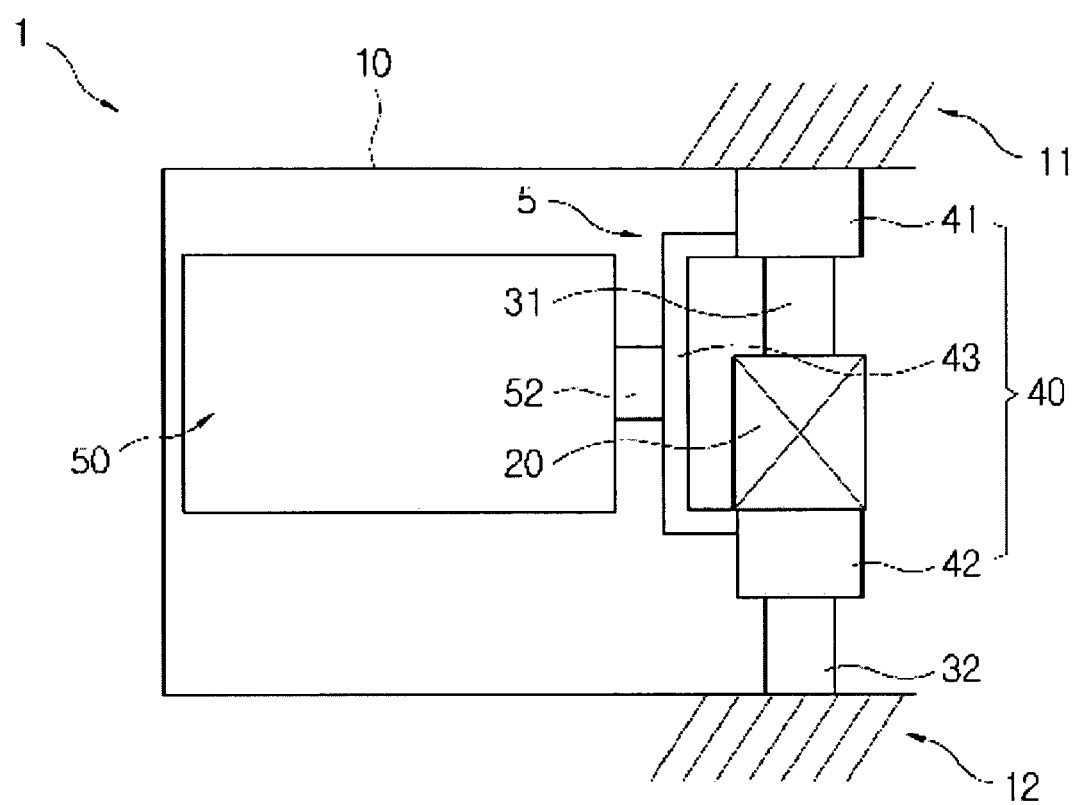
Figure 7:
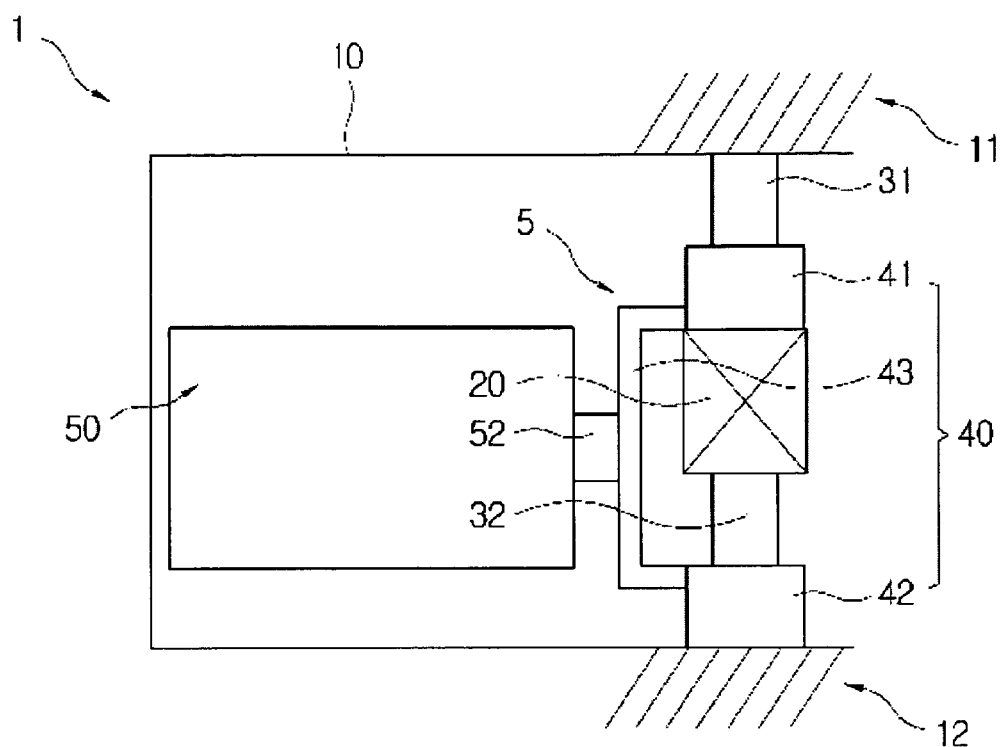
Figure 8:
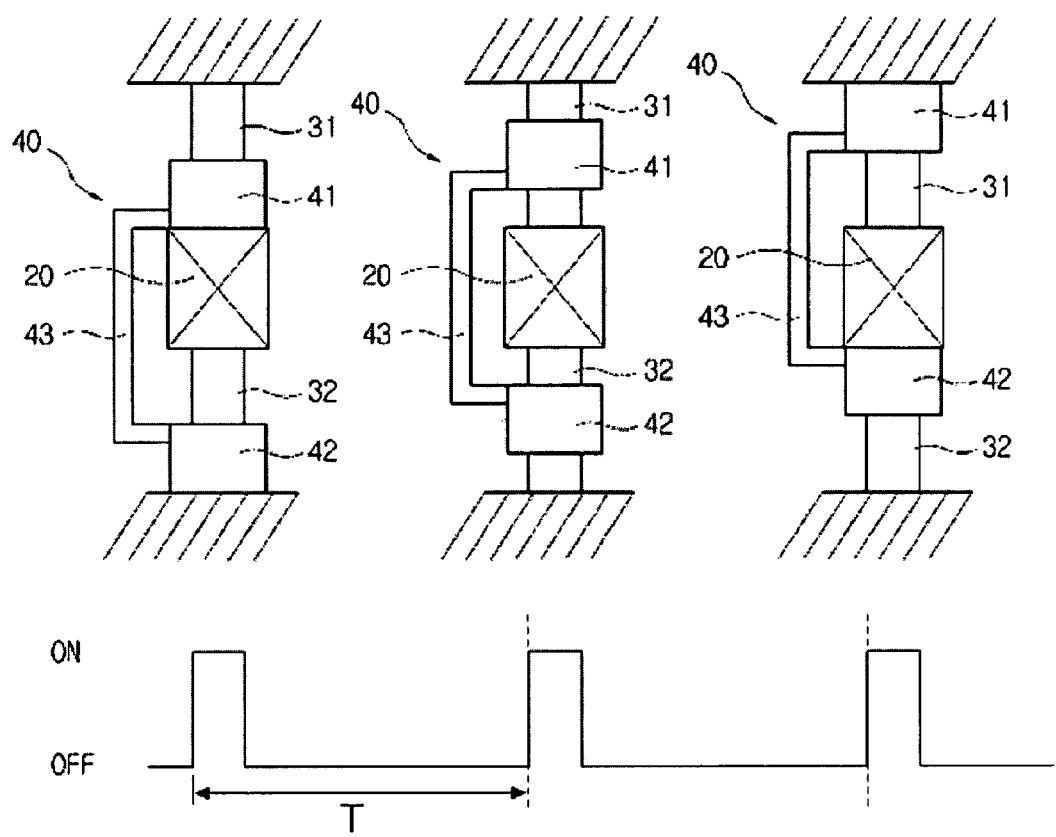
FIG. 8 is a structure diagram illustrating a pulse width modulating scheme.
Figure 9:
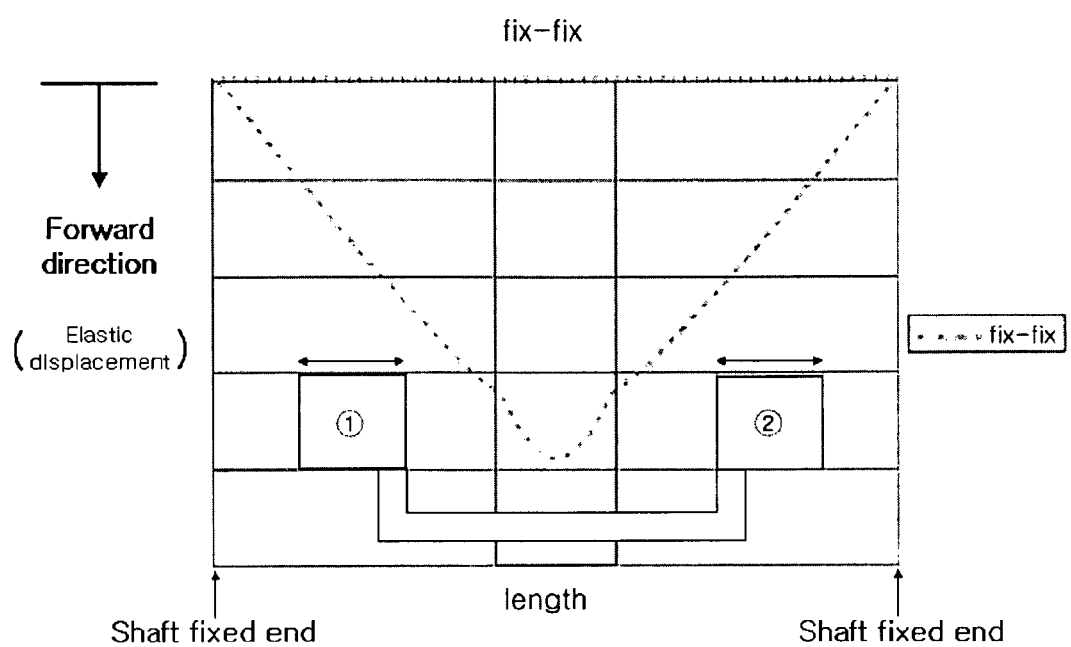
FIGS. 9 and 10 are graphs illustrating elastic displacements of shafts.
Figure 10:
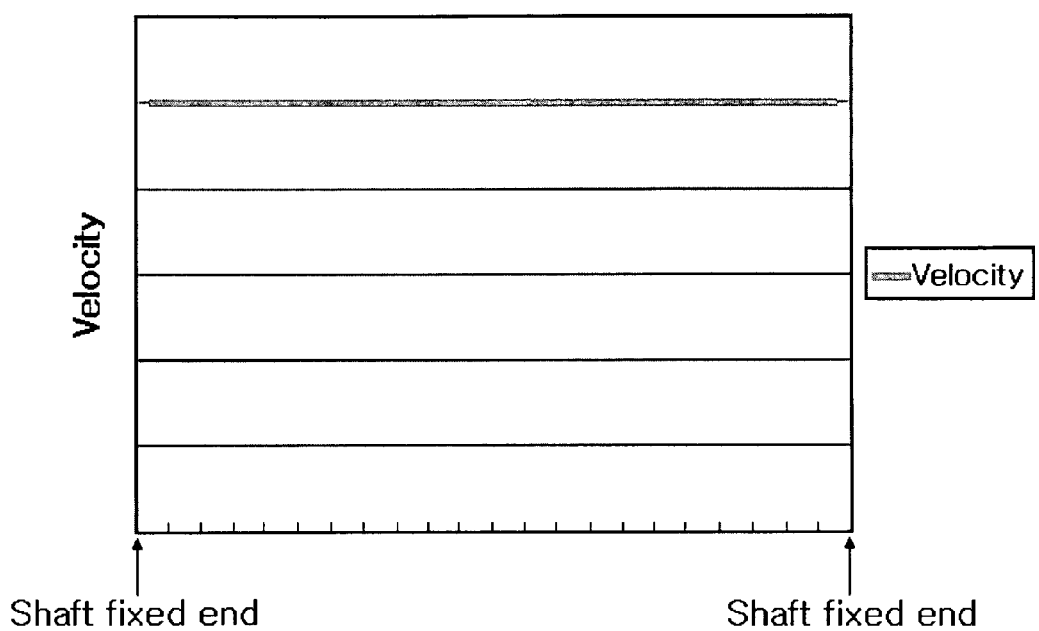

FIGS. 5 to 7 are diagrams schematically illustrating a structure of a camera module applied to a mobile terminal according to an embodiment of the invention, where a camera lens is operating. FIG. 8 is a structure diagram illustrating a pulse width modulating scheme. FIGS. 9 and 10 are graphs illustrating elastic displacements of shafts.

Referring to FIG. 5, a camera module 1 applied to a mobile terminal according to an embodiment of the invention roughly includes a module housing 10, a linear motor 5, and a camera lens 50.

The module housing 10 is a part constituting an outline of the camera module 1. When a camera structure having an auto focusing function is applied to a mobile terminal not shown, it is not desirable that plural components of a camera are individually assembled and thus the camera module 1 manufactured as a single product is generally assembled to a corresponding position of the mobile terminal.

In this case, the part constituting the outline of the camera module 1 serves as the module housing 10. When a particular module housing 10 is not provided, an outer chassis or frame of an area in which the camera module 1 is disposed serves as the module housing 10.

The linear motor 5 serves to linearly control the camera lens 50 so as to move the camera lens 50 disposed in the module housing 10, that is, to embody the auto focusing function of the camera lens 50.

The linear motor 5 includes a piezoelectric substrate 20, first and second shafts 31 and 32 coupled to both sides of the piezoelectric substrate 20, and a moving member 40 connected to the camera lens 50 and coupled to the first and second shafts 31 and 32 to be movable in the longitudinal direction of the first and second shafts 31 and 32.

The piezoelectric substrate 20 serves to generate a driving force for moving the camera lens 50. When a voltage is applied to the piezoelectric substrate 20, a vibration mode in the longitudinal direction is generated. When the vibration mode is transmitted to the first and second shafts 31 and 32, the moving member 40 coupled to the first and second shafts 31 and 32 moves in the longitudinal direction of the first and second shafts 31 and 32 to enable the camera lens 50 to move.

The piezoelectric substrate 20 is polarized in the thickness direction in this embodiment, but is not limited to it. When a voltage is applied to the piezoelectric substrate 20, the displacement can be maximized by matching the AC voltage with the resonance frequency.

On the other hand, the piezoelectric substrate 20 is disposed at a position corresponding to the thickness of the camera lens 50.

That is, since the camera lens 50 has a necessary thickness, a space corresponding to the thickness of the camera lens 50 and an allowable space for movement of the camera lens 50 are necessary in the module housing 10. Accordingly, when the piezoelectric substrate 20 is disposed at the position corresponding to the spaces, it means that the piezoelectric substrate 20 is disposed in a necessary space, thereby preventing the unnecessary increase in thickness.

The first and second shafts 31 and 32 are disposed in two directions with respect to the piezoelectric substrate 20, not in a single direction like the past structure. That is, the first and second shafts 31 and 32 are coupled to both sides of the piezoelectric substrate 20.

In this example, the first and second shafts 31 and 32 are coupled to the piezoelectric substrate 20 by adhesion, but the invention is not limited to the adhesion.

When the first and second shafts 31 and 32 are coupled to both sides of the piezoelectric substrate 20, the fixation is structurally stable and the difference in speed, which may be caused between the shafts 31 and 32 at the time of actuating the piezoelectric substrate 20, can be made uniform.

When the exposed ends of the first and second shafts 31 and 32 are under the free-free condition at the time of coupling the first and second shafts 31 and 32 to both sides of the piezoelectric substrate 20, the driving area of the moving member 40 is restricted to a partial area, not the overall area, of the first and second shafts 31 and 32, thereby causing a dead zone.

Accordingly, in this embodiment, the generation of the dead zone which may be caused during the driving of the camera lens 50 is prevented by fixing the exposed ends of the first and second shafts 31 and 32. In this embodiment, the exposed ends of the first and second shafts 31 and 32 are fixed to first and second fixing portions 11 and 12 forming side walls of the module housing 10.

Since the invention is not limited to it, the fixing positions of the exposed ends of the first and second shafts 31 and 32 may be located at any position as long as they do not cause an increase in thickness of the mobile terminal.

The moving member 40 is a portion coupled to the first and second shafts 31 and 32 to move in the longitudinal direction of the first and second shafts 31 and 32, thereby allowing the camera lens 50 to move together.

The moving member 40 includes first and second moving blocks 41 and 42 movably coupled to the first and second shafts 31 and 32, respectively, and a connection bar 43 connecting the first and second moving blocks 41 and 42 to each other to equalize the moving speeds of the first and second moving blocks 41 and 42. The connection bar 43 is connected to the camera lens 50 via a connection portion 52.

When the first and second moving blocks 41 and 42 are connected to the first and second shafts 31 and 32, respectively, and are connected to each other with the connection bar 43 to move as the single-body moving member 40, the moving speed of the moving member 40 is made uniform all over the area of the first and second shafts 31 and 32. In other words, the moving speed of the moving member 40 can be set to an average value of the speeds of the first and second shafts 31 and 32, thereby stabilizing the movement of the camera lens 50.

On the other hand, referring to FIGS. 9 and 10, as described above, when the exposed ends of the first and second shafts 31 and 32 are fixed, the elastic displacement gradually increases from the first and second fixing portions 11 and 12 at both ends to the piezoelectric substrate 20 at the center, particularly as shown in FIG. 9. The first and second shafts 31 and 32 have a great displacement at the center and the magnitude of the displacement symmetrically decreases toward the first and second fixing portions 11 and 12 at both ends. In this case, as indicated by ①and ②of FIGS. 5 and 9, when the first and second moving blocks 41 and 42 are connected through the connection bar 43, it is possible to prevent the difference in speed due to the difference in displacement between the first and second shafts 31 and 32, thereby making the speed uniform all over the driving area. With this driving characteristic, it is possible to improve the precision in controlling a position of a precise stage and to improve the precision of position control using a complex speed profile.

The piezoelectric substrate 20 may employ a pulse width modulating scheme as a driving scheme, as shown in FIG. 8. On the basis of the pulse width modulating scheme, the moving member 40 can reciprocate in the longitudinal direction of the first and second shafts 31 and 32 by inertia and the friction.

By employing the above-mentioned structure, it is possible to prevent the occurrence of the dead zone with a simple structure, thereby improving the auto focusing function of the camera lens 20. Since the structure can be applied to a zoom function of the camera lens 20, it is possible to improve the motion characteristic similarly to the auto focusing function.

In addition, thanks to the entire structure or the structural feature due to the arrangement of the piezoelectric substrate 20, it is possible to prevent the increase in thickness of the camera module 1, thereby contributing to the decrease in thickness and the compactness of the mobile terminal.

According to this embodiment, by applying the linear motor 5 instead of the stepping motor or the voice coil motor, it is possible to prevent a stoppage at the time of moving the camera lens 50 and to reduce the amount of tilt to enable the linear control, thereby reducing the power consumption.

The invention is not limited to the above-mentioned embodiments, but it will be apparently understood by those skilled in the art that the invention is modified in various forms without departing from the spirit and scope of the invention. Therefore, the modifications should be included in the appended claims of the invention.

What is claimed is:

1. A linear motor comprising:
a piezoelectric substrate generating a vibration mode in a longitudinal direction on the basis of an applied voltage;
first and second shafts coupled to both sides of the piezoelectric substrate with the piezoelectric substrate interposed therebetween; and
a moving member coupled to at least one of the first and second shafts to be movable in the longitudinal direction of the first and second shafts and connected to a camera lens on one side.

2. The linear motor according to claim 1, wherein the piezoelectric substrate is disposed at a position corresponding to a thickness of the camera lens.

3. The linear motor according to claim 1, wherein the moving member includes:
first and second moving blocks movably coupled to the first and second shafts, respectively; and
a connection bar connecting the first and second moving blocks to each other so as to equalize the moving speeds of the first and second moving blocks.

4. The linear motor according to claim 3, further comprising a connection portion connecting the connection bar and the camera lens to each other.

5. The linear motor according to claim 1, further comprising first and second fixing portions fixing exposed ends of the first and second shafts, respectively.

6. The linear motor according to claim 5, wherein the first and second fixing portions are disposed on side walls of a module housing constituting an outline of the camera lens.

7. A camera module comprising:
a module housing;
a linear motor having a piezoelectric substrate generating a vibration mode in a longitudinal direction on the basis of an applied voltage, first and second shafts coupled to both sides of the piezoelectric substrate with the piezoelectric substrate interposed therebetween, and a moving member coupled to at least one of the first and second shafts to be movable in the longitudinal direction of the first and second shafts; and
a camera lens connected to the moving member of the linear motor in the module housing.

\* \* \* \* \*